(12) United States Patent
Koike et al.

(10) Patent No.: US 7,570,286 B2
(45) Date of Patent: Aug. 4, 2009

(54) SYSTEM AND METHOD FOR CREATING COMPOSITE IMAGES

(75) Inventors: Hiroyuki Koike, Utsunomiya (JP);
Yoichi Sugimoto, Utsunomiya (JP);
Ichiro Masaki, Boxborough, MA (US);
Izumi Kondo, Shioya-gun (JP); Shugo Kondo, Utsunomiya (JP)

(73) Assignees: Honda Motor Co., Ltd., Tokyo (JP);
Massachusetts Intstitute of Technology, Cambridge, MA (US)

( * ) Notice: Subject to any disclaimer, the term of this patent is extended or adjusted under 35 U.S.C. 154(b) by 630 days.

(21) Appl. No.: 11/139,120

(22) Filed: May 27, 2005

(65) Prior Publication Data
US 2006/0268110 A1 Nov. 30, 2006

(51) Int. Cl.
*H04N 9/68* (2006.01)
*H04N 5/225* (2006.01)

(52) U.S. Cl. ...................................... 348/235; 348/262

(58) Field of Classification Search ................. 348/262, 348/264, 265, 235, 159, 47, 48, 148, 164, 348/234; 382/302, 318, 240
See application file for complete search history.

(56) References Cited

U.S. PATENT DOCUMENTS

| 4,967,276 A | * | 10/1990 | Murakami et al. | .......... 348/164 |
| 5,268,961 A | * | 12/1993 | Ng | .......................... 348/425.2 |
| 5,748,786 A | * | 5/1998 | Zandi et al. | .................. 382/240 |
| 5,880,856 A | * | 3/1999 | Ferriere | .................. 358/426.11 |
| 5,881,176 A | * | 3/1999 | Keith et al. | .................. 382/248 |
| 6,553,071 B1 | * | 4/2003 | Kim et al. | .............. 375/240.19 |
| 6,833,866 B1 | * | 12/2004 | Suzuki | ..................... 348/231.2 |
| 6,996,170 B2 | * | 2/2006 | Thoumy et al. | ............. 375/240 |
| 2003/0063201 A1 | * | 4/2003 | Hunter et al. | ............... 348/241 |
| 2004/0091240 A1 | * | 5/2004 | Takei | ........................... 386/46 |

FOREIGN PATENT DOCUMENTS

JP   08-191442   7/1996

\* cited by examiner

*Primary Examiner*—Sinh N Tran
*Assistant Examiner*—Nicholas G Giles
(74) *Attorney, Agent, or Firm*—Fish & Richardson P.C.

(57) ABSTRACT

A support apparatus for sense of vision includes: a filter device that extracts low frequency components, and respective high frequency components in at least a horizontal direction and a vertical direction from original images obtained by image capture by a plurality of image pickup devices, a frequency component combining device that combines the low frequency components of each of the original images extracted by the filter device to generate a combined low frequency component, and combines the high frequency components of each of the original images extracted by the filter device in at least the horizontal direction and the vertical direction to generate a combined horizontal high frequency component and a combined vertical high frequency component; and a composite image formation device that combines the low combined frequency component, the combined horizontal high frequency component, and the combined vertical high frequency component, generated by the frequency component combining device, to generate a composite image.

3 Claims, 7 Drawing Sheets

VISIBLE IMAGE V

NEAR INFRARED IMAGE N

FAR INFRARED IMAGE F

COMBINED COMPONENT

I     II

III     IV

COMPOSITE IMAGE

SYSTEM AND METHOD FOR CREATING COMPOSITE IMAGES

BACKGROUND OF THE INVENTION

1. Field of the Invention

The present invention relates to a support apparatus for the sense of vision that displays images taken by a plurality of cameras.

2. Description of Related Art

Conventionally, a monitoring image display device is known which includes, for example: a plurality image pickup devices that have differing detection wavelength bands; a plurality of detection devices that detect image information specific to each detection wavelength band from respective image signals that are output from the plurality of image pickup devices; an image fusion device that selectively superimposes the respective image signals output from the plurality of image pickup devices, and the respective image information output from the plurality of detection devices, and generates a fusion image; and a display device that displays the fusion image (for example, see Japanese Unexamined Patent Application, First Publication No. H08-191442).

This monitoring image display device superimposes distribution information for a high temperature zone onto a visible light camera image signal, as image information specific to each detection wavelength band, by detecting edge information by differential processing such as filtering image signals of a visible light camera, detecting high temperature zone distribution information by a binarization process with respect to infrared camera image signals, and superimposing edge information onto the infrared camera image signals.

Incidentally, in the monitoring image display device according to the example of the related art mentioned above, when image information specific to the detection wavelength bands from image signals that are output from the image pickup devices is detected, then for example in the case of executing recognition processing for edges and high temperature zones with respect to respective image signals of the visible light camera and the infrared camera, and selecting appropriate zones on the image data, the processing required for this selection is complex, and the calculation process load is increased, so that the device configuration is enlarged, and it may become difficult to display fusion images in a so-called real time manner.

Moreover, in the above mentioned prior art, the edge information is simply superimposed onto the image signal of the infrared camera, and the distribution information of the high temperature zone is superimposed onto the image signal of the visible light camera. However, in the image data for each of the respective detection wavelength bands, the locally appearing characteristics cannot be fully reflected into a fusion image, so that there is a problem in that the respective image signals output from a plurality of image pickup devices cannot be appropriately used.

SUMMARY OF THE INVENTION

The present invention takes the above-described situations into consideration with an object of providing a support apparatus for the sense of vision that can support an operator's faculty of visual recognition while preventing the calculation processing load required for generating a display image to be presented to the operator, from being increased.

In order to solve the above-described problems and achieve the object, a support apparatus for sense of vision of the present invention includes: a filter device (for example, the filter processing sections 21 of the embodiment) that extracts low frequency components (for example, the low frequency components $I_{(V, N, F)}$ of the embodiment), and respective high frequency components (for example, the high frequency components $II_{(V, N, F)}$ and $III_{(V, N, F)}$ of the embodiment) in at least a horizontal direction and a vertical direction from original images (for example, the respective images V, N, and F of the embodiment) obtained by image capture by a plurality of image pickup devices (for example, the cameras 12, 14, and 16 of the embodiment); a frequency component combining device (for example, the frequency component combining section 22 of the embodiment) that combines the low frequency components of each of the original images extracted by the filter device to generate a combined low frequency component (for example, the combined low frequency component I of the embodiment), and combines the high frequency components of each of the original images extracted by the filter device in at least the horizontal direction and the vertical direction to generate a combined horizontal high frequency component (for example, the combined horizontal high frequency component III of the embodiment) and a combined vertical high frequency component (for example, the combined vertical high frequency component II of the embodiment); and a composite image formation device (for example, the composite image formation section 23 of the embodiment) that combines the combined low frequency component, the combined horizontal high frequency component, and the combined vertical high frequency component, generated by the frequency component combining device, to generate a composite image.

Using the above-described support apparatus for sense of vision, by simple processing for generating a composite image based on the low frequency components extracted from each of the original images obtained by image capture by the plurality of image pickup devices, and the high frequency components for each of the directions, it is possible to generate a composite image in a so-called real time manner while preventing the calculation processing load required for generating the composite image, from being increased. Furthermore, since the low frequency components of each of the original images obtained by image capture by the plurality of image pickup devices are combined to generate a combined low frequency component, and the high frequency components for each of the original images are combined for at least the horizontal direction and the vertical direction to generate a combined horizontal high frequency component and a combined vertical high frequency component, for example, it is possible to fully reflect characteristics appearing locally in each of the original images according to the detection wavelength bands and the like of each of the image pickup devices in a composite image.

Moreover, in a support apparatus for sense of vision of the present invention, the filter device extracts high frequency components (for example, the high frequency components $IV_{(V, N, F)}$ of the embodiment) in the diagonal direction from each of the original images obtained by image capture by the plurality of image pickup devices, the frequency component combining device combines each of the high frequency components for each of the original images extracted by the filter device, and generates a combined diagonal high frequency component (for example, the combined diagonal high frequency component IV of the embodiment), and the composite image generating device combines the combined low frequency component, the combined horizontal high frequency component, the combined vertical high frequency component, and the combined diagonal high frequency component generated by the frequency component combining device, and generates a composite image.

Using the support apparatus for sense of vision described above, by extracting high frequency components in the diagonal direction in addition to those in the horizontal direction and the vertical direction, as high frequency components of each of the original images obtained by image capture by the plurality of image pickup devices, it is possible to detect characteristics appearing locally in each of the original images, with high accuracy.

Furthermore, in a support apparatus for sense of vision of the present invention, the frequency component combining device combines the low frequency components for each of the original images extracted by the filter device, in proportions (for example, the proportions $\alpha$, $\beta$, and $\gamma$ of the embodiment) corresponding to the brightness values of each of the low frequency components, and generates the aforementioned combined low frequency component.

Using the support apparatus for sense of vision described above, by combining the low frequency components for each of the original images extracted by the filter device in proportions corresponding to the brightness values of each of the low frequency components, and generating a combined low frequency component, it is possible to facilitate recognition of objects in a composite image based on the combined low frequency component.

Moreover, in the support apparatus for sense of vision of the present invention, the frequency component combining device combines the low frequency components for each of the original images extracted by the filter device in proportions corresponding to the brightness values of each of the high frequency components corresponding to each of the low frequency components, and generates the aforementioned combined low frequency component.

Using the support apparatus for sense of vision described above, by combining the low frequency components for each of the original images extracted by the filter device in proportions corresponding to the brightness values of each of the high frequency components corresponding to each of the low frequency components, and generating a combined low frequency component, it is possible to facilitate recognition of objects in a composite image based on the combined low frequency component.

Furthermore, in the support apparatus for sense of vision of the present invention, the frequency component combining device generates the combined high frequency components using the high frequency components at which the brightness values in each direction of the high frequency components, for each of the original images extracted by the filter device, are at a maximum.

Using the support apparatus for sense of vision described above, it is possible to fully reflect characteristics appearing locally in each of the original images according to the detection wavelength bands and the like of each of the image pickup devices in a composite image.

As described above, using the support apparatus for sense of vision of the present invention, it is possible to generate a composite image in a so-called real time manner while preventing the calculation processing load required for generating the composite image, from being increased. Moreover, it is possible, for example, to fully reflect characteristics appearing locally in each of the original images according to the detection wavelength bands and the like of each of the image pickup devices in the composite image.

Furthermore, using the support apparatus for sense of vision of the present invention, by extracting high frequency components in the diagonal direction in addition to those in the horizontal direction and the vertical direction, as high frequency components of each of the original images obtained by image capture by the plurality of image pickup devices, it is possible to detect characteristics appearing locally in each of the original images, with high accuracy.

Moreover, using the support apparatus for sense of vision of the present invention, it is possible to facilitate recognition of objects in a composite image.

DETAILED DESCRIPTION OF THE INVENTION

Hereunder, a support apparatus for sense of vision according to one embodiment of the present invention is described, with reference to the drawings.

Figure 1:
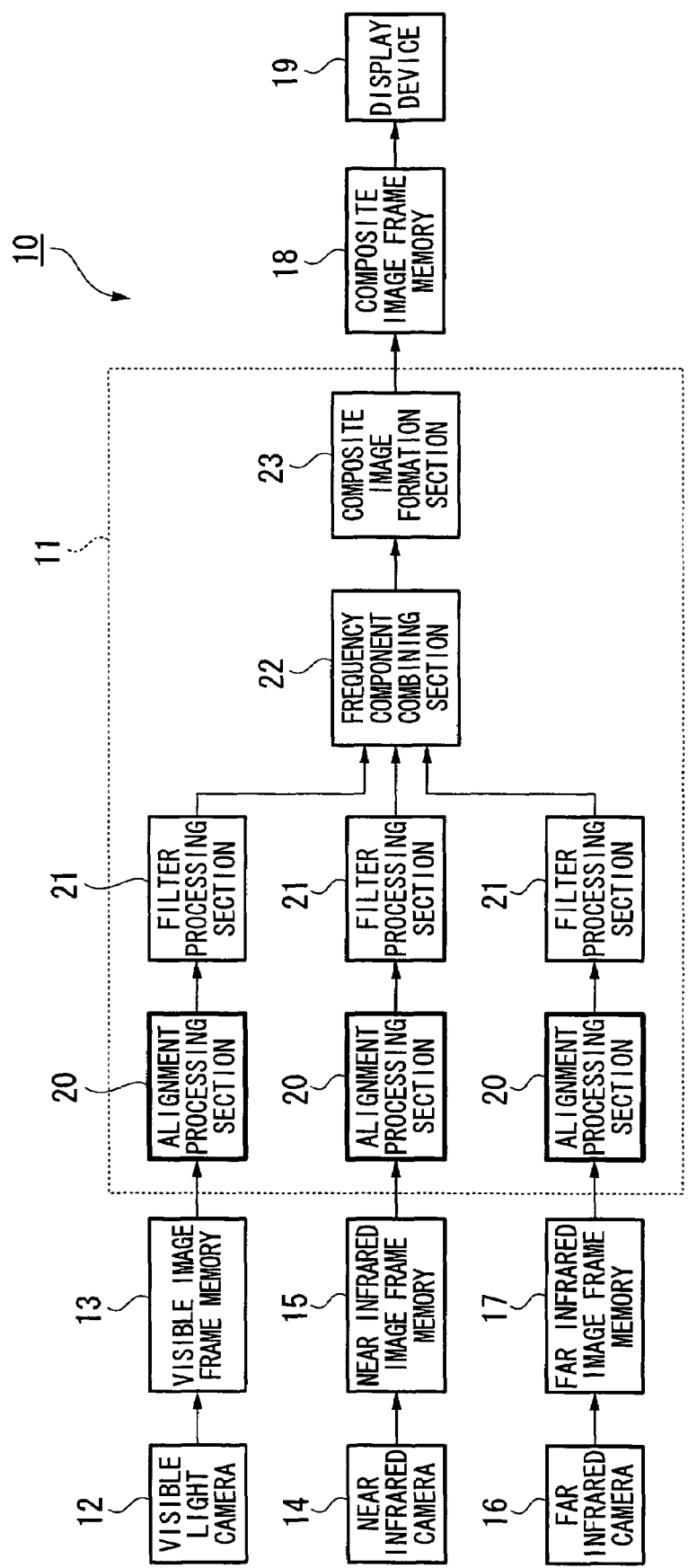
FIG. 1 is a block diagram showing the structure of a support apparatus for sense of vision according to an embodiment of the present invention.

The support apparatus for sense of vision 10 according to the present embodiment, as shown in FIG. 1 for example, includes: a CPU 11 (Central Processing Unit) that constitutes an image processing unit of the support apparatus for sense of vision 10; a visible light camera 12 including a CCD camera or a CMOS camera or the like, which is capable of imaging in the visible light region; a visible image frame memory 13 that stores in frame units a visible image V obtained by image capture by the visible light camera 12; a near infrared camera 14 including a CCD camera or a CMOS cameras or the like, which is capable of imaging in the near infrared region; a near infrared image frame memory 15 that stores in frame units a near infrared image N obtained by image capture by the near infrared camera 14; a far infrared camera 16 which is capable of imaging in the far infrared region; a far infrared image frame memory 17 that stores in frame units a far infrared image F obtained by image capture by the infrared camera 16; a composite image frame memory 18 that stores in frame units a composite image output from the CPU 11; and a display device 19 that displays the composite image of the frame unit that has been stored in the composite image frame memory 18.

Moreover, this support apparatus for sense of vision 10 is, for example, mounted on a car, and generates a composite image based on the respective images of the external world in the traveling direction of the car, obtained by image capture by the respective cameras 12, 14, and 16, and this composite image is displayed, for example, on a display screen integrated with various instruments that display various traveling statuses of the vehicle, or on a display device of a navigation device, or alternatively on a display device 19 such as a HUD (Head Up Display) which displays various information on the front window at a position that does not interfere with the field of front vision of the driver.

Figure 2:
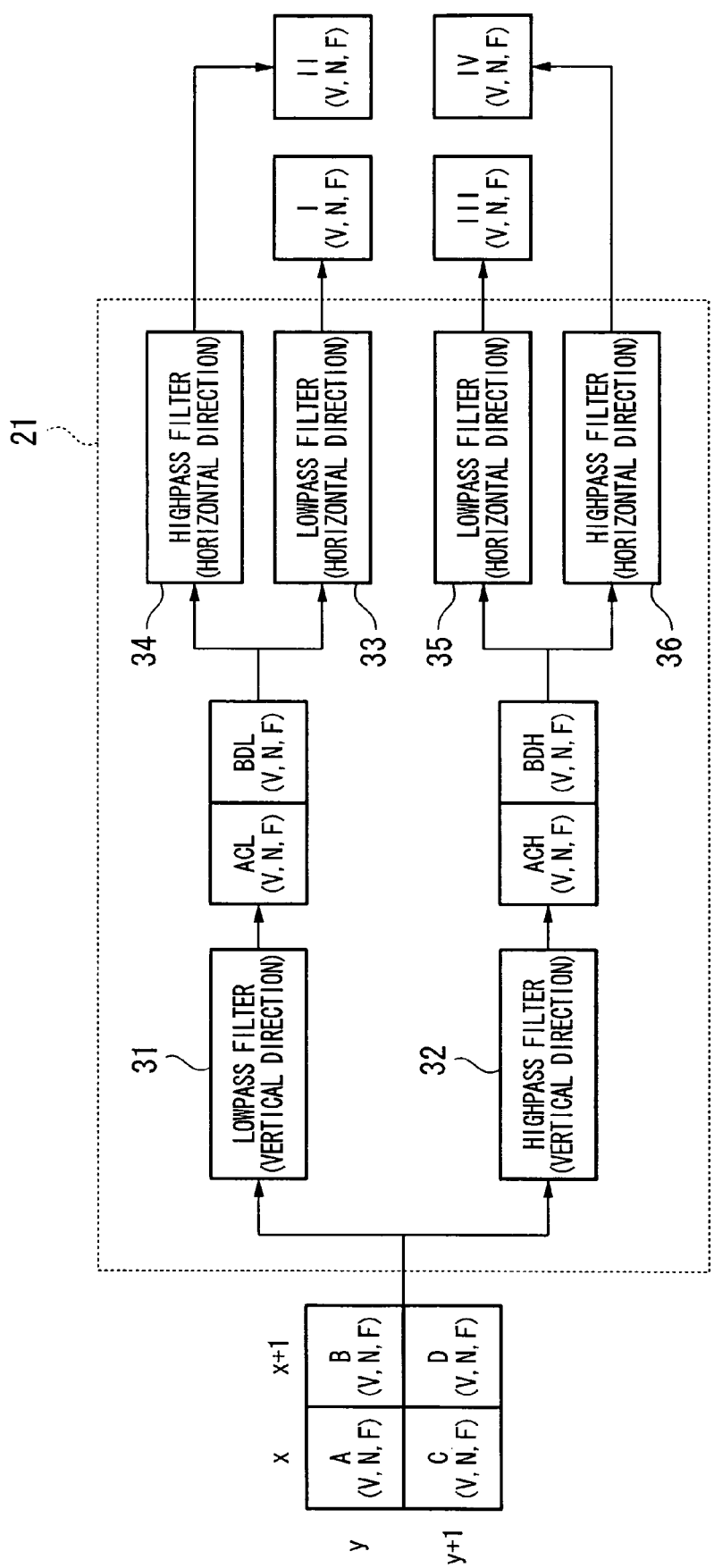
FIG. 2 is a block diagram showing the structure of the filter processing sections shown in FIG. 1.

The CPU 11 includes for example: alignment processing sections 20 for each of the respective images V, N, and F obtained by image capture by the respective cameras 12, 14, and 16; filter processing sections 21; a frequency component combining section 22; and a composite image formation section 23. Furthermore the respective filter processing sections 21, as shown in FIG. 2, include; a lowpass filter 31 and a highpass filter 32 for operating along the vertical direction in the respective images V, N, and F; and lowpass filters 33 and 35 and highpass filters 34 and 36 for operating along the horizontal direction.

The respective lowpass filters 31, 33 and 35 extract regions in the respective images V, N, and F, in which brightness change is relatively small, and the respective highpass filters 32, 34 and 36 extract regions (namely, the edges) in the respective images V, N, and F, in which brightness change is relatively large.

For each of the respective images V, N, and F obtained by image capture by the respective cameras 12, 14, and 16, the filter processing sections 21 select respective original pixels $A_{(V, N, F)}$, $B_{(V, N, F)}$, $C_{(V, N, F)}$, $D_{(V, N, F)}$ corresponding to a predetermined number of adjacent coordinate locations, for example four locations (x, y), (x+1, y), (x, y+1), (x+1, y+1), sequentially from among all of the pixels that constitute each of the images V, N, and F after alignment processing, execute discrete wavelet conversion using the Haar function, for example, on the respective original pixels $A_{(V, N, F)}$, $\cdots$, $D_{(V, N, F)}$, and extract low frequency components $I_{(V, N, F)}$ for each of the respective images V, N, and F, high frequency components $II_{(V, N, F)}$ with respect to the vertical direction, high frequency components $III_{(V, N, F)}$ with respect to the horizontal direction, and high frequency components $IV_{(V, N, F)}$ with respect to the diagonal direction, as shown in the following mathematical equation (1).

$$\begin{bmatrix} I_{(V,N,F)} \\ II_{(V,N,F)} \\ III_{(V,N,F)} \\ IV_{(V,N,F)} \end{bmatrix} = W \begin{bmatrix} A_{(V,N,F)} \\ B_{(V,N,F)} \\ C_{(V,N,F)} \\ D_{(V,N,F)} \end{bmatrix} = \begin{bmatrix} \frac{1}{4} & \frac{1}{4} & \frac{1}{4} & \frac{1}{4} \\ \frac{1}{2} & \frac{1}{2} & -\frac{1}{2} & -\frac{1}{2} \\ \frac{1}{2} & -\frac{1}{2} & \frac{1}{2} & -\frac{1}{2} \\ 1 & -1 & -1 & 1 \end{bmatrix} \begin{bmatrix} A_{(V,N,F)} \\ B_{(V,N,F)} \\ C_{(V,N,F)} \\ D_{(V,N,F)} \end{bmatrix} \quad (1)$$

The lowpass filter 31 operating along the vertical direction in the respective images calculates the average of the brightness values of adjacent pixels in the vertical direction.

Furthermore, the highpass filter 32 operating along the vertical direction in the respective images calculates the difference in the brightness values between adjacent pixels in the vertical direction.

Moreover, the lowpass filters 33 and 35 operating along the horizontal direction in the respective images calculate the average of the brightness values of adjacent pixels in the horizontal direction.

Furthermore, the highpass filters 34 and 36 operating along the horizontal direction in the respective images calculate the difference in the brightness values between adjacent pixels in the horizontal direction.

As shown in FIG. 2 for example, for the four adjacent original pixels $A_{(V, N, F)}$, $B_{(V, N, F)}$, $C_{(V, N, F)}$, and $D_{(V, N, F)}$, selected sequentially from all of the pixels that constitute the respective images V, N, and F captured by the cameras 12, 14, and 16, and alignment processed, firstly, the average of the brightness values of the pixels $A_{(V, N, F)}$ and $C_{(v, N, F)}$, and the pixels $B_{(V, N, F)}$ and $D_{(V, N, F)}$, which are adjacent in the vertical direction, are calculated by the lowpass filter 31, and two pixels $ACL_{(V, N, F)}$ and $BDL_{(V, N, F)}$, which are adjacent in the horizontal direction and have the calculated results as their brightness values, are output.

Moreover, for the four adjacent original pixels $A_{(V, N, F)}$, $B_{(V, N, F)}$, $C_{(V, N, F)}$, and $D_{(V, N, F)}$, the difference in the brightness values between the pixels $A_{(V, N, F)}$ and $C_{(V, N, F)}$, and the pixels $B_{(V, N, F)}$ and $D_{(V, N, F)}$, which are adjacent in the vertical direction, are calculated by the highpass filter 32, and two pixels $ACH_{(V, N, F)}$ and $BDL_{(V, N, F)}$, which are adjacent in the horizontal direction and have the calculated results, are output.

For the two pixels $ACL_{(V, N, F)}$ and $BDL_{(V, N, F)}$, which are adjacent in the horizontal direction and are output from the lowpass filter 31, the average of the brightness values of the pixels $ACL_{(V, N, F)}$ and $BDL_{(V, N, F)}$, which are adjacent in the horizontal direction, is calculated by the lowpass filter 33, and a low frequency component $I_{(V, N, F)}$ having the calculated result is output.

Furthermore, for the two pixels $ACL_{(V, N, F)}$ and $BDL_{(V, N, F)}$, which are adjacent in the horizontal direction and are output from the lowpass filter 31, the difference in the brightness values between the pixels $ACL_{(V, N, F)}$ and $BDL_{(V, N, F)}$, which are adjacent in the horizontal direction, is calculated by the high pass filter 34, and a high frequency component $II_{(V, N, F)}$ in the vertical direction, which has the calculated result, is output.

Moreover, for the two pixels $ACH_{(V, N, F)}$ and $BDH_{(V, N, F)}$, which are adjacent in the horizontal direction and are output from the highpass filter 32, the average value of the pixels $ACH_{(V, N, F)}$ and $BDH_{(V, N, F)}$, which are adjacent in the horizontal direction, is calculated by the lowpass filter 35, and a high frequency component $III_{(V, N, F)}$ in the horizontal direction, which has the calculated result, is output.

Furthermore, for the two pixels $ACH_{(V, N, F)}$ and $BDH_{(V, N, F)}$, which are adjacent in the horizontal direction and are output from the highpass filter 32, the difference in the brightness values between the pixels $ACH_{(V, N, F)}$ and $BDH_{(V, N, F)}$, which are adjacent in the horizontal direction, is calculated by the highpass filter 36, and a high frequency component $IV_{(V, N, F)}$ in the diagonal direction, which has the calculated result, is output.

Figure 3:
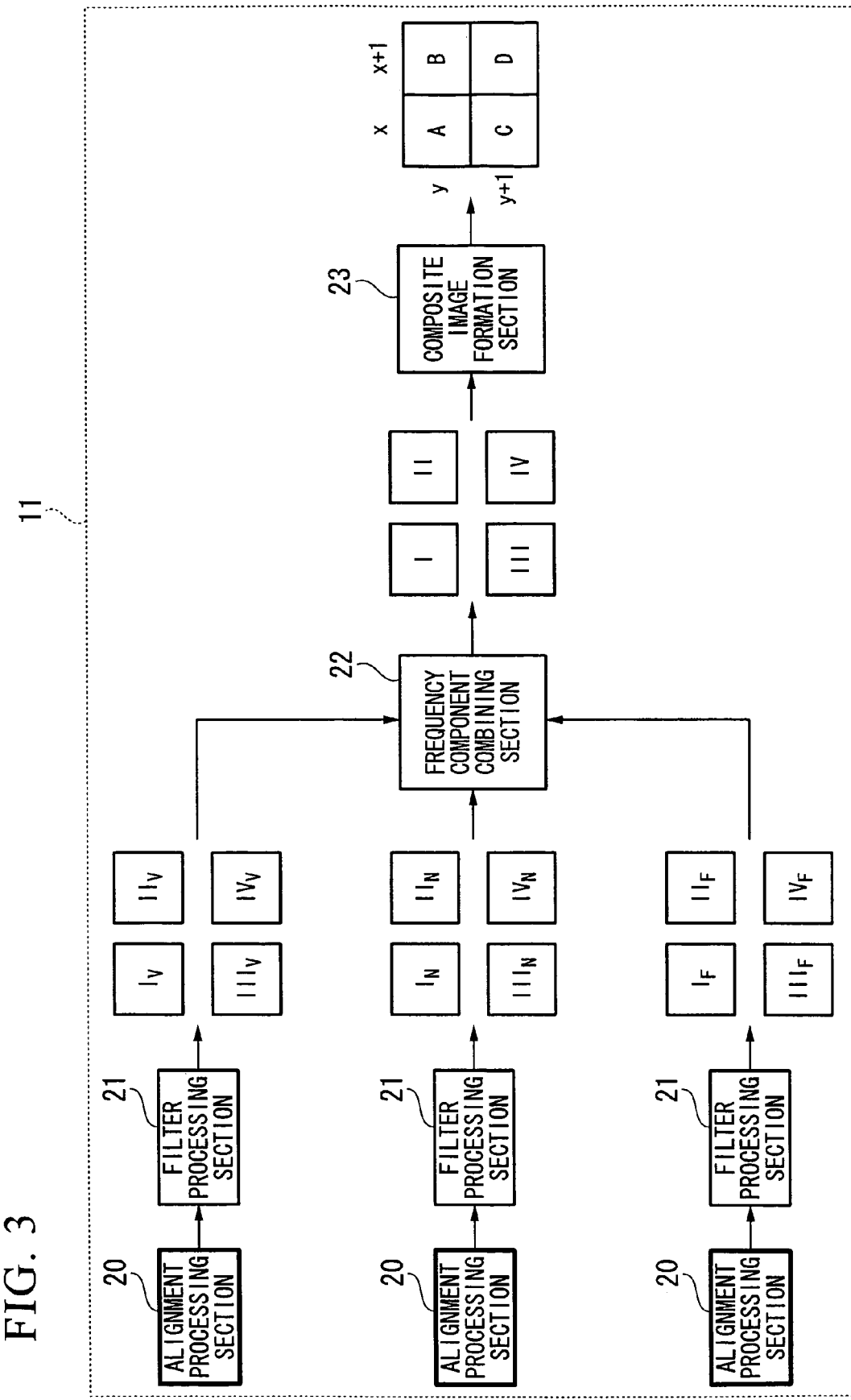
FIG. 3 is a block diagram showing the structure of the CPU shown in FIG. 1.

As shown in FIG. 3, the frequency component combining section 22 combines the low frequency components $I_V$, $I_N$ and $I_F$ of each of the images V, N, and F extracted by the respective filter processing sections 21, and generates a combined low frequency component I, which is a brightness component. Furthermore it combines the high frequency components $II_V$, $II_N$, $II_F$, and $III_V$, $III_N$, $III_F$, and $IV_V$, $IV_N$, $IV_F$, in the respective directions of each of the images V, N, and F extracted by the respective filter processing sections 21, in the vertical direction, the horizontal direction, and the diagonal direction respectively, and generates a combined vertical high frequency component II, a combined horizontal high frequency component III, and a combined diagonal high frequency component IV, which are edge components of each of the directions.

Here, the low frequency components $I_V$, $I_N$ and $I_F$ for each of the respective images V, N, and F are combined in proportions α, β, and γ corresponding to the brightness values of the respective low frequency components $I_V$, $I_N$ and $I_F$ as shown in the following mathematical equation (2), for example. Here, the proportions α, β, and γ satisfy α+β+γ=1.

Furthermore, for the high frequency components $II_{(V, N, F)}$, $III_{(V, N, F)}$ and $IV_{(V, N, F)}$ in the respective directions of each of the images V, N, and F, as shown in the following mathematical equation (2) for example, the maximum values $\max(IV_V, IV_N, IV_F)$, $\max(III_V, III_N, III_F)$, and $\max(IV_V, IV_N, IV_F)$ of each of the brightness values in each direction are selected, and derive a combined vertical high frequency component II, a combined horizontal high frequency component III, and a combined diagonal high frequency component IV.

$$\left.\begin{array}{l} I = \alpha \times I_V + \beta \times I_N + \gamma \times I_F \\ II = \max(II_V, II_N, II_F) \\ III = \max(III_V, III_N, III_F) \\ IV = \max(IV_V, IV_N, IV_F) \end{array}\right\} \quad (2)$$

As shown in FIG. 3 for example, based on the combined low frequency component I, the combined vertical high frequency component II, the combined horizontal high frequency component III, and the combined diagonal high frequency component IV output from the frequency component combining section 22, the composite image formation section 23 performs an inverse conversion of the discrete wavelet conversion as shown in mathematical equation (1) described above, and calculates the combined pixels A, B, C, and D respectively corresponding to four adjacent coordinate locations (x, y), (x+1, y), (x, y+1) and (x+1, y+1), as shown for example in the following mathematical equation (3).

$$\begin{bmatrix} A \\ B \\ C \\ D \end{bmatrix} = W^{-1} \begin{bmatrix} I \\ II \\ III \\ IV \end{bmatrix} = \begin{bmatrix} 1 & \frac{1}{2} & \frac{1}{2} & \frac{1}{4} \\ 1 & \frac{1}{2} & -\frac{1}{2} & -\frac{1}{4} \\ 1 & -\frac{1}{2} & \frac{1}{2} & -\frac{1}{4} \\ 1 & -\frac{1}{2} & -\frac{1}{2} & \frac{1}{4} \end{bmatrix} \begin{bmatrix} I \\ II \\ III \\ IV \end{bmatrix} \quad (3)$$

The support apparatus for sense of vision 10 according to the present embodiment has the above-described construction. Next is a description of the operation of the support apparatus for sense of vision 10, with reference to the appended drawings.

Figure 4:
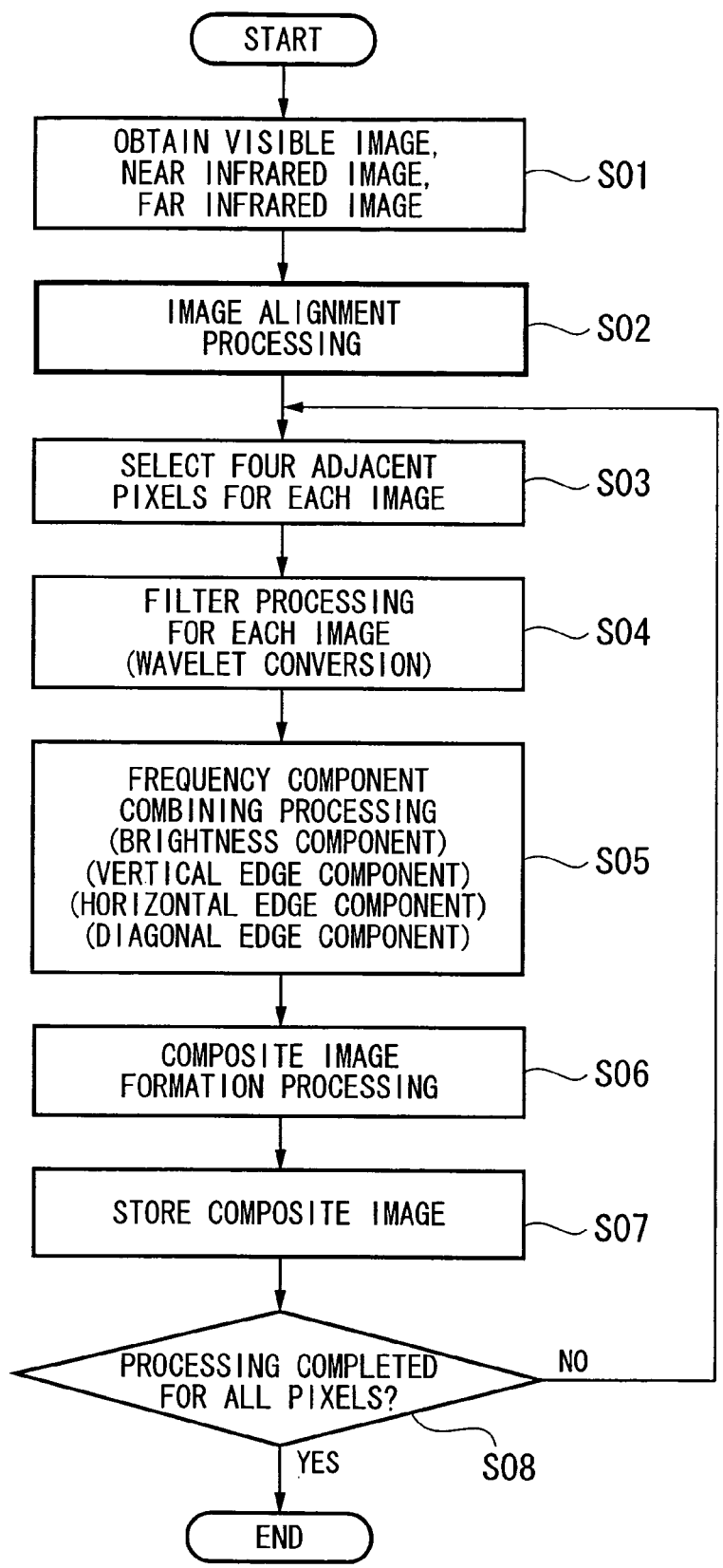
FIG. 4 is a flow chart showing the operation of the support apparatus for sense of vision shown in FIG. 1.
Figure 5A:
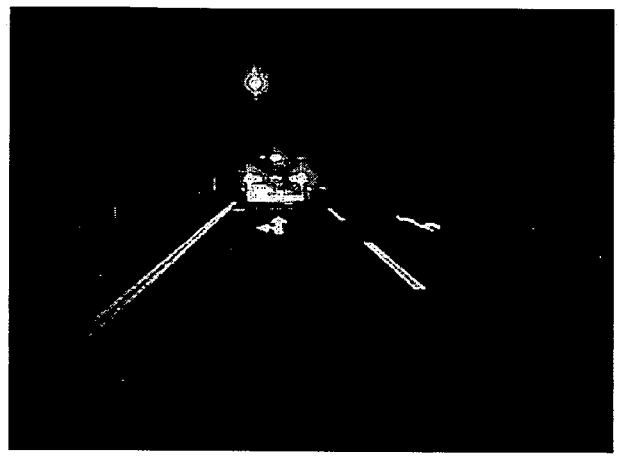
FIG. 5A is a picture showing an example of a visible image V.
Figure 5B:
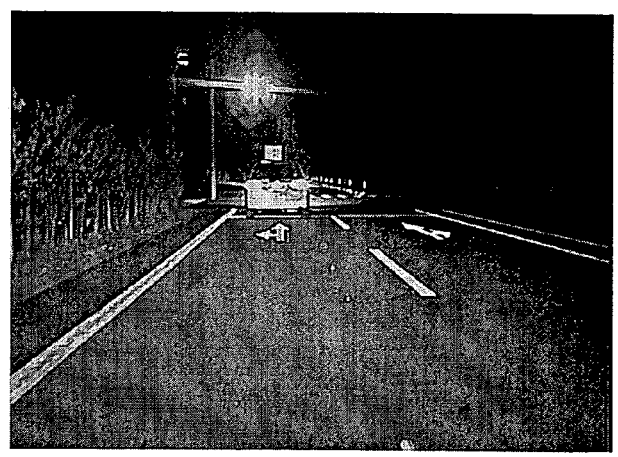
FIG. 5B is a picture showing an example of a near infrared image N.
Figure 5C:
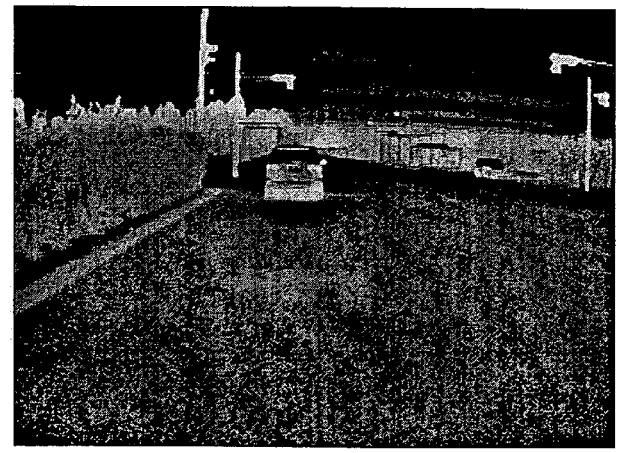
FIG. 5C is a picture showing an example of a far infrared image F.

Firstly, in step S01 shown in FIG. 4, a visible image V, a near infrared image N, and a far infrared image F, captured by the cameras 12, 14, and 16 respectively, are obtained as shown in the examples of FIGS. 5A to 5C.

Next, in step S02, alignment processing of each of the images V, N, and F is performed, and the sizes and locations of each of the images V, N, and F are normalized.

Next, in step S03, the original pixels $A_{(V, N, F)}$, $B_{(V, N, F)}$, $C_{(V, N, F)}$ and $D_{(V, N, F)}$, corresponding to four adjacent coordinate locations (x, y), (x+1, y), (x, y+1) and (x+1, y+1) respectively, are selected from among all of the pixels constituting the images V, N, and F.

In step S04, for each of the original pixels $A_{(V, N, F)}, \ldots, D_{(V, N, F)}$, a discrete wavelet conversion is executed using the Haar function for example. For example, as shown in FIGS. 6A to 6C, for each of the images V, N, and F, the low frequency component $I_{(V, N, F)}$, the high frequency component $II_{(V, N, F)}$ in the vertical direction, the high frequency component $III_{(V, N, F)}$ in the horizontal direction, and the high frequency component $IV_{(V, N, F)}$ in the diagonal direction, are extracted.

Next, in step S05, the low frequency components $I_V$, $I_N$ and $I_F$ of each of the images V, N, and F are combined, and the combined low frequency component I, which is the brightness component, is generated. Furthermore, for each of the images V, N, and F, the high frequency components $II_V$, $II_N$, $II_F$, and $III_V$, $III_N$, $III_F$, and $IV_V$, $IV_N$, $IV_F$ in each direction are combined in the vertical direction, the horizontal direction, and the diagonal direction, and a combined vertical high frequency component II, a combined horizontal high frequency component III, and a combined diagonal high frequency component IV, which are edge components of each of the directions, are generated.

Figure 6A:
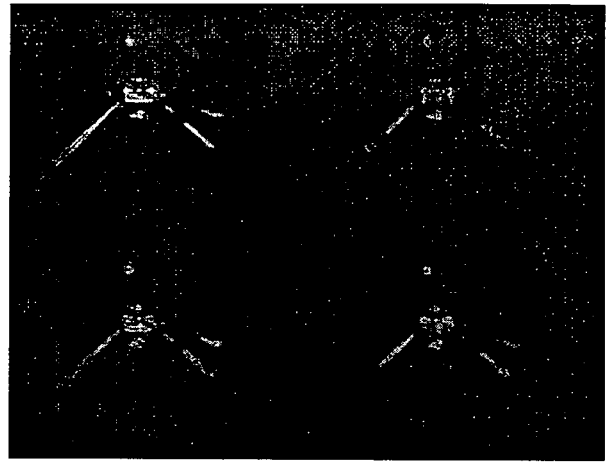
FIG. 6A is a picture showing an example of a low frequency component Iv, a high frequency component $II_V$ with respect to the vertical direction, a high frequency component $III_V$ with respect to the horizontal direction, and a high frequency component $IV_V$ with respect to the diagonal direction, of the visible image V.
Figure 6B:
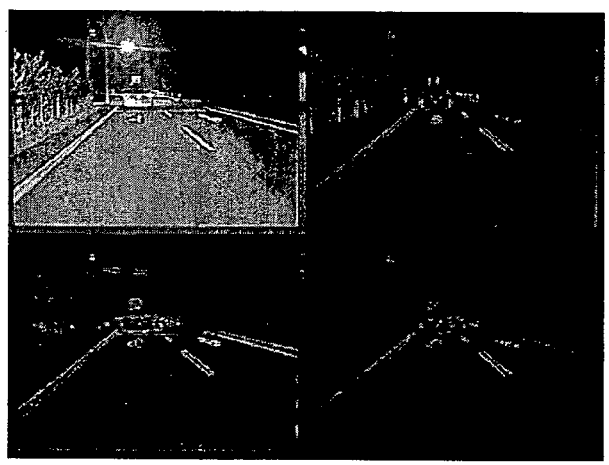
FIG. 6B is a picture showing an example of a low frequency component $I_N$, a high frequency component $II_N$ with respect to the vertical direction, a high frequency component $III_N$ with respect to the horizontal direction, and a high frequency component $IV_N$ with respect to the diagonal direction, of the near infrared picture N.
Figure 6C:
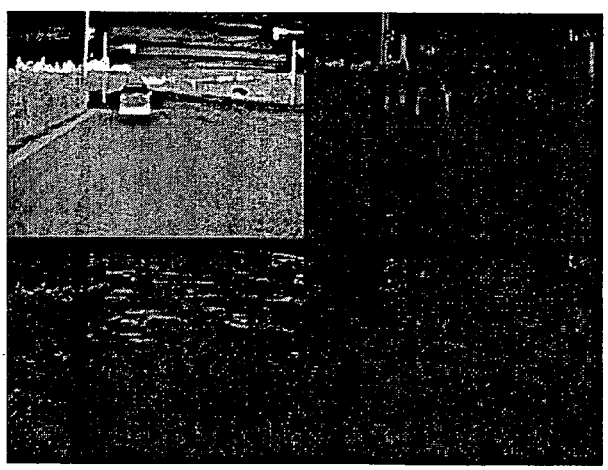
FIG. 6C is a picture showing an example of a low frequency component $I_F$, a high frequency component $II_F$ with respect to the vertical direction, a high frequency component $III_F$ with respect to the horizontal direction, and a high frequency component $IV_F$ with respect to the diagonal direction, of the far infrared picture F.

In the processing of step S05, if each of the combined components I, II, III, and IV generated with respect to four original pixels $A_{(V, N, F)}, \ldots, D_{(V, N, F)}$ selected as appropriate from among all of the pixels constituting the images V, N, and F, is combined for all of the pixels of each of the images V, N, and F for example, images as shown for example in FIGS. 6A to 6C can be obtained.

Next, in step S06, based on the combined low frequency component I, the combined vertical high frequency component II, the combined horizontal high frequency component III, and the combined diagonal high frequency component IV, output from the frequency component combining section 22, the inverse conversion of the discrete wavelet conversion is performed, and each of the combined pixels A, B, C, and D respectively corresponding to four adjacent coordinate locations (x, y), (x+1, y), (x, y+1) and (x+1, y+1) is calculated.

Next, in step S07, each of the generated combined pixels A, B, C, and D is stored in the composite image frame memory 18.

In step S08, it is determined whether the above-described series of processing of step S03 to step S07 is completed or not for all of the pixels constituting the respective images V, N, and F.

In the case where the determination result is "no", control returns to step S03.

On the other hand, in the case where the determination result is "yes", the series of processing is terminated.

Figure 7:
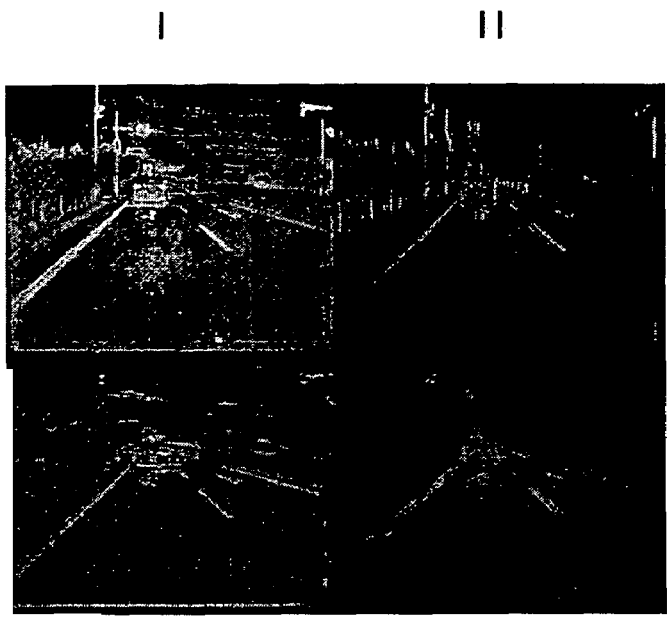
FIG. 7 is a picture showing an example of an image obtained by combining each of the combined components I, II, III, and IV generated with respect to four original pixels $A_{(V,N,F)}, \ldots, D_{(V,N,F)}$ selected as appropriate from among all of the pixels constituting the images V, N, and F, being combined for all of the pixels of the images V, N, and F.
Figure 8:
FIG. 8 is a picture showing an example of a composite image in which each of the combined pixels A, B, C, and D generated with respect to the four original pixels $A_{(V,N,F)}, \ldots, D_{(V,N,F)}$ selected as appropriate from among all of the pixels constituting the images V, N, and F, is combined for all of the pixels of the images V, N, and F.

In this manner, the respective combined pixels A, B, C, and D generated with respect to the four original pixels $A_{(V,N,F)}, \ldots, D_{(V,N,F)}$ selected as appropriate from among all of the pixels constituting the images V, N, and F, is combined for all of the pixels of the images V, N, and F in the composite image frame memory 18, and a composite image as shown in FIG. 7, for example, can be obtained.

As described above, using the support apparatus for sense of vision 10 according to the present invention, by simple processing for generating a composite image based on the low frequency components $I_{(V, N, F)}$ extracted from each of the images V, N, and F obtained by image capture by the plurality of image pickup devices 12, 14, and 16, and the high frequency components $II_{(V,N,F)}$, $III_{(V,N,F)}$ and $IV_{(V,N,F)}$ for each of the directions, it is possible to generate a composite image in a so-called real time manner while preventing the calculation processing load required for generating the composite image from being increased.

Furthermore, since the low frequency components $I_{(V,N,F)}$ of each of the images respectively obtained by image capture by the plurality of cameras 12, 14, and 16 are combined to generate a combined low frequency component I, and the high frequency components $II_{(V,N,F)}$, $III_{(V,N,F)}$ and $IV_{(V,N,F)}$ for each of the images V, N, and F are combined in each of the respective directions to generate a combined vertical high frequency component II, a combined horizontal high frequency component III, and a combined diagonal high frequency component IV, it is possible to fully reflect characteristics appearing locally in each of the images V, N, and F according to the detection wavelength bands of the respective cameras 12, 14, and 16 in the composite image.

Moreover, by combining the low frequency components $I_{(V, N, F)}$ for each of the images V, N, and F extracted by the filter processing sections 21 in proportions $\alpha$, $\beta$, and $\gamma$ corresponding to the brightness values of each of the low frequency components $I_{(V, N, F)}$, and generating the combined low frequency component I, it is possible to facilitate recognition of objects in a composite image based on the combined low frequency component I.

Furthermore, it is possible to generate a composite image by performing the series of processing of step S04 to step S07 for four original pixels $A_{(V, N, F)}, \ldots, D_{(V, N, F)}$ selected as appropriate from among all of the pixels constituting the images V, N, and F, for each of the images V, N, and F. For example, compared with performing, in sequence, filter processing by discrete wavelet conversion, processing for combining the frequency components $I_{(V,N,F)}$, $II_{(V,N,F)}$, $III_{(V,N,F)}$ and $IV_{(V,N,F)}$ for each of the images V, N, and F for each of the frequency components, and processing for generating a composite image from each of the composite components I, II, III, and IV, with respect to all of the pixels constituting the respective images V, N, and F, for each of the images V, N, and F, it is possible to prevent the memory capacity required to store data and the like from a range of calculation results generated temporarily when the series of processing is carried out, from being increased.

In the embodiment described above, a discrete wavelet conversion using the Haar function is performed when extracting the low frequency components $I_{(V, N, F)}$ for each of the images V, N, and F, and the high frequency components $II_{(V,N,F)}$, $III_{(V,N,F)}$ and $IV_{(V,N,F)}$ in each direction. However, the invention is not limited to this, and a discrete wavelet conversion using another function may be carried out, or other conversion processing may also be carried out.

In the embodiment described above, the highpass filter 36 for the diagonal direction may be omitted. In this case, the composite image is created based on the combined low frequency component I, the combined vertical high frequency component II, and the combined horizontal high frequency component III.

In the embodiment described above, low frequency components $I_V$, $I_N$ and $I_F$ for each of the images V, N, and F are combined in proportions $\alpha$, $\beta$, and $\gamma$ corresponding to the brightness values of the low frequency components $I_V$, $I_N$ and $I_F$. However, the invention is not limited to this, and for example, the low frequency components $I_V$, $I_N$ and $I_F$ for each of the images V, F and N may be combined in proportion corresponding to the brightness values of the high frequency components ($II_V$, $III_V$, $IV_V$), ($II_N$, $III_N$, $IV_N$) and ($II_F$, $III_F$, $IV_F$) corresponding to each of the low frequency components $I_V$, $I_N$ and $I_F$.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A support apparatus for sense of vision comprising:
  a filter device that extracts low frequency components, and respective high frequency components in at least a horizontal direction and a vertical direction from original images obtained by image capture by a plurality of image pickup devices;
  a frequency component combining device that combines the low frequency components of each of the original images extracted by the filter device to generate a combined low frequency component, and combines the high frequency components of each of the original images extracted by the filter device in at least the horizontal direction and the vertical direction to generate a combined horizontal high frequency component and a combined vertical high frequency component; and
  a composite image formation device that combines the low combined frequency component, the combined horizontal high frequency component, and the combined vertical high frequency component, generated by the frequency component combining device, to generate a composite image,
  wherein the frequency component combining device combines the low frequency components for each of the original images extracted by the filter device, in proportions corresponding to brightness values of each of the low frequency components, and generates the combined low frequency component.

2. A support apparatus for sense of vision comprising:
  a filter device that extracts low frequency components, and respective high frequency components in at least a horizontal direction and a vertical direction from original images obtained by image capture by a plurality of image pickup devices;
  a frequency component combining device that combines the low frequency components of each of the original images extracted by the filter device to generate a combined low frequency component, and combines the high frequency components of each of the original images extracted by the filter device in at least the horizontal direction and the vertical direction to generate a combined horizontal high frequency component and a combined vertical high frequency component; and a composite image formation device that combines the low combined frequency component, the combined horizontal high frequency component, and the combined vertical high frequency component, generated by the frequency component combining device, to generate a composite image, wherein the frequency component combining device combines the low frequency components for each of the original images extracted by the filter device in proportions corresponding to brightness values of each of the high frequency components corresponding to each of the low frequency components, and generates the combined low frequency component.

3. A support apparatus for sense of vision comprising:

a filter device that extracts low frequency components, and respective high frequency components in at least a horizontal direction and a vertical direction from original images obtained by image capture by a plurality of image pickup devices;

a frequency component combining device that combines the low frequency components of each of the original images extracted by the filter device to generate a combined low frequency component, and combines the high frequency components of each of the original images extracted by the filter device in at least the horizontal direction and the vertical direction to generate a combined horizontal high frequency component and a combined vertical high frequency component; and a composite image formation device that combines the low combined frequency component, the combined horizontal high frequency component, and the combined vertical high frequency component, generated by the frequency component combining device, to generate a composite image, wherein the frequency component combining device generates the combined high frequency components using the high frequency components at which brightness values in each direction of the high frequency components, for each of the original images extracted by the filter device, are at a maximum.

\* \* \* \* \*